March 19, 1940.  F. G. ALBORN ET AL  2,193,867
MOTOR VEHICLE CONTROL MECHANISM
Filed Nov. 12, 1938  3 Sheets-Sheet 1
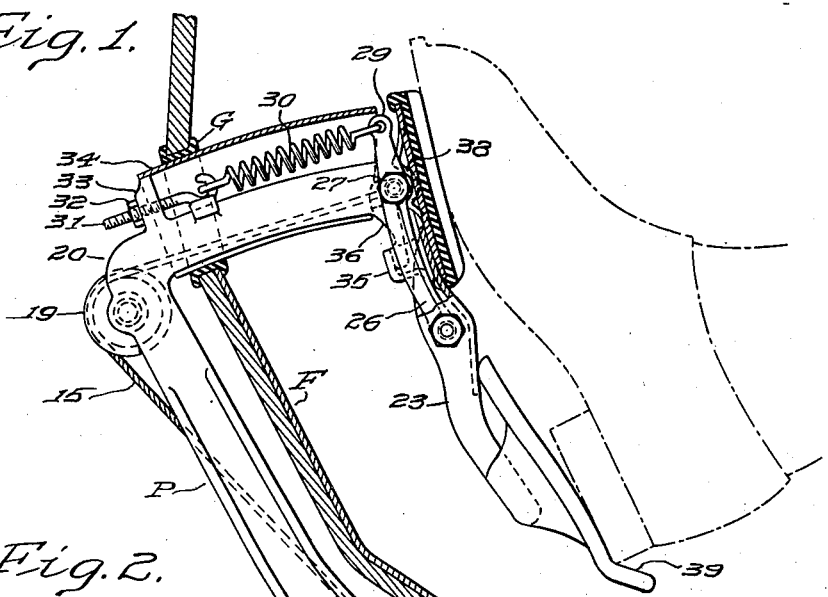
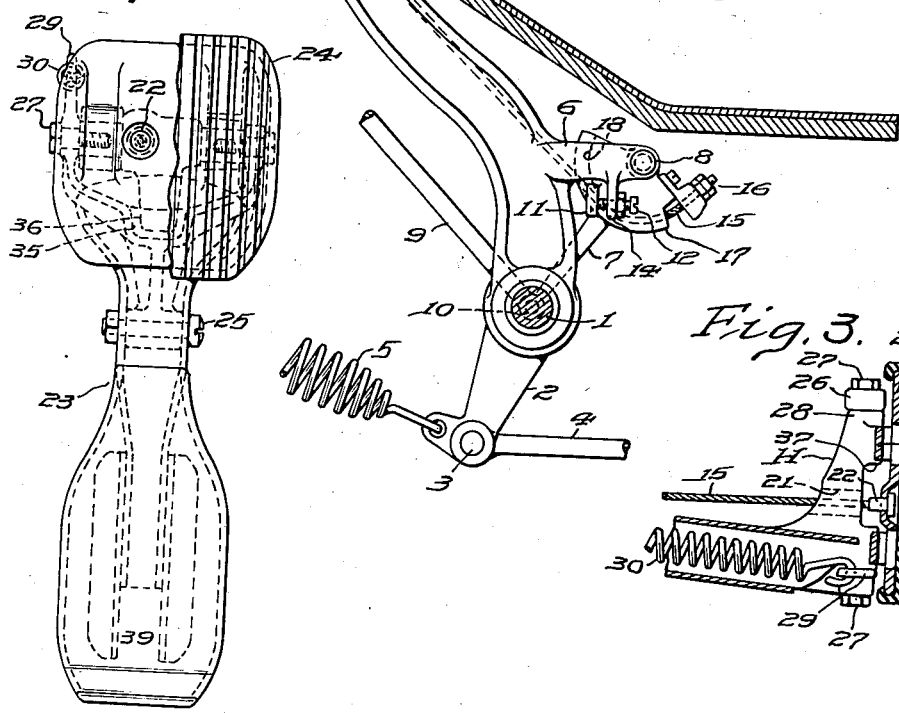
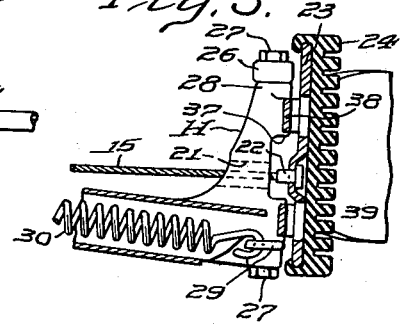
WITNESS
F. J. Hartman
INVENTORS
Frank G. Alborn,
James B. Franks Jr.
BY George K. Hilbert
ATTORNEY

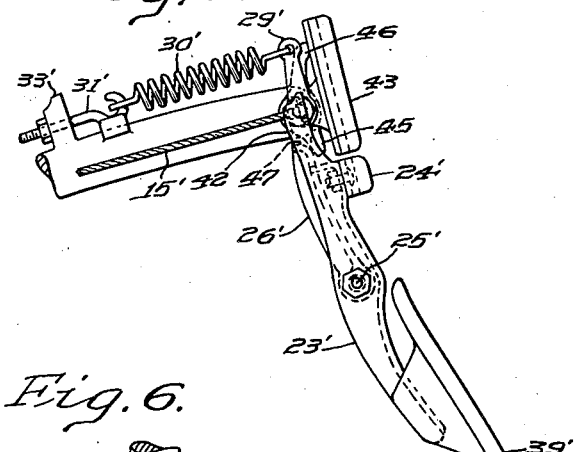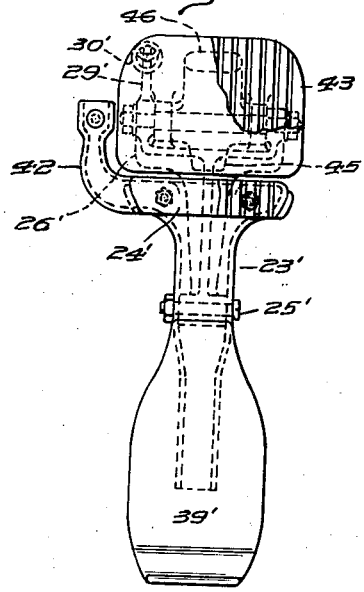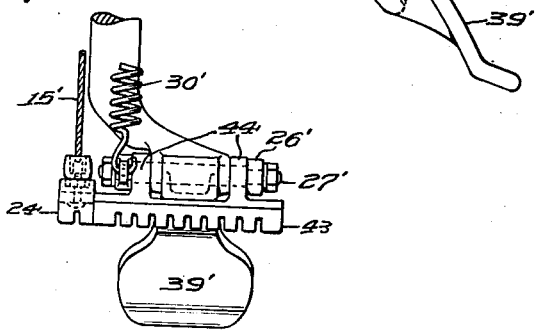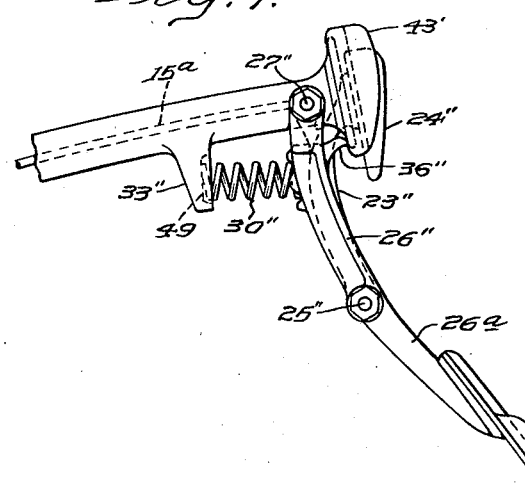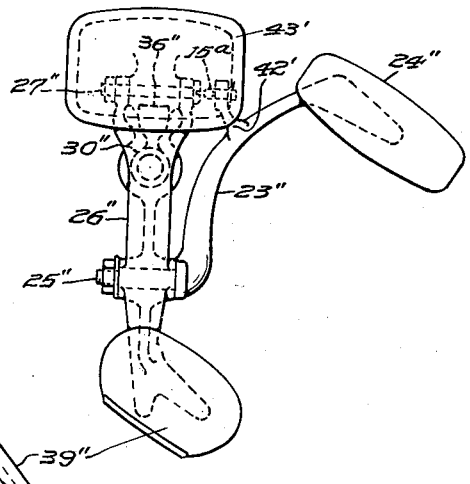

March 19, 1940.　　　F. G. ALBORN ET AL　　　2,193,867
MOTOR VEHICLE CONTROL MECHANISM
Filed Nov. 12, 1938　　　3 Sheets-Sheet 3
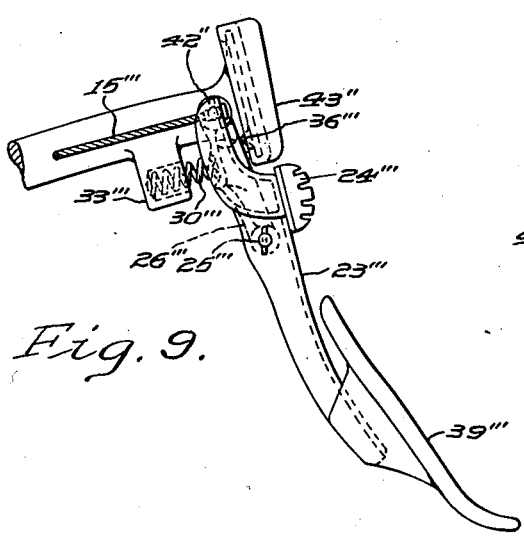
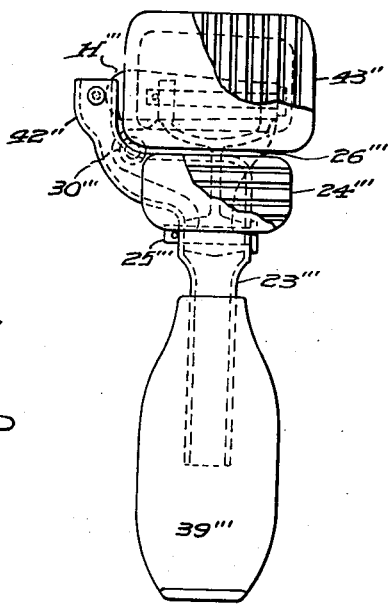
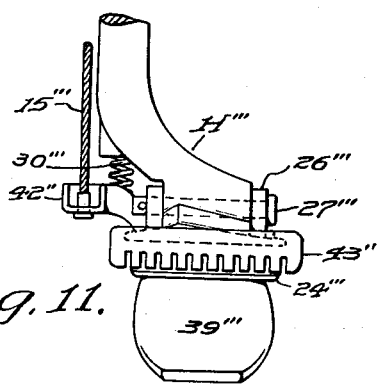
INVENTORS
Frank G. Alborn,
James B. Franks Jr.
BY
ATTORNEY
WITNESS Patented Mar. 19, 1940

2,193,867

UNITED STATES PATENT OFFICE 2,193,867

MOTOR VEHICLE CONTROL MECHANISM

Frank G. Alborn, Norwalk, Conn., and James B. Franks, Jr., Philadelphia, Pa., assignors to Andrew R. McCown, Philadelphia, Pa., as trustee Application November 12, 1938, Serial No. 239,996

19 Claims. (Cl. 192—3)

This invention relates to mechanism for actuating motor vehicle control elements, especially the brakes and engine throttle, to provide maximum safety of vehicle operation and maximum physical comfort to the operator.

In our prior applications for United States Letters Patent for Motor vehicle control mechanism, Serial No. 200,404, filed April 6, 1938, and Serial No. 227,872, filed September 1, 1938, we disclosed mechanisms intended for like purposes and the present application is a continuation in part thereof, the invention to which it relates operating in part according to generally similar mechanical principles but embodying certain improvements in the mechanisms disclosed in said prior applications.

All the several mechanisms include a brake pedal and an accelerator lever or pedal adapted to operate the engine throttle by movement about a fulcrum which is fixed with respect to the brake pedal during throttle operation but adapted to be moved relatively thereto to interrupt operation of the throttle when the brakes are to be applied.

In the mechanisms disclosed in our said application Serial No. 200,404 the movement of the accelerator pedal fulcrum upon initiation of braking action brings about operative disconnection of the accelerator pedal from the throttle actuating mechanism, while in those disclosed in the second of our said applications, Serial No. 227,872, the accelerator lever and its fulcrum are moved substantially pivotally about its connection with the throttle operating mechanism when the brakes are applied and the mechanisms hereinafter described are perhaps most closely similar to those disclosed in this second application. Thus each comprises an accelerator lever fulcrum supporting link pivoted to the brake pedal substantially coaxially with the connections between the accelerator lever and throttle actuating mechanism; in some embodiments, however, when the operator's heel is used for operating the accelerator lever, the ball of the foot can simultaneously control its action, thus affording a high degree of sensitivity in throttle control and positively closing the throttle at initiation of braking, while in other embodiments the accelerator lever is similarly adapted for independent pivotal movement relatively to the brake pedal about a movable fulcrum but is so constructed that it does not react materially, if at all, against one part of the operator's foot when it is actuated by another part thereof.

It is therefore an object of the invention to provide combined brake and throttle control mechanism comprising an accelerator pedal or lever normally operative to actuate the throttle and means for supporting it on a fulcrum movable relatively to the brake pedal whereby when the fulcrum supporting means is moved from normal position the accelerator lever is rendered substantially ineffective to operate the throttle.

Another object is to provide combined brake and throttle control mechanism in which operation of an accelerator lever by the operator's heel is in a measure subject to control and restraint through reaction of a part of the lever against the ball of the foot whereby control of the lever and hence of the engine throttle is effected by a balancing of forces exerted by the operator as distinguished from application of but a single applied force.

A further object is to provide in certain preferred embodiments of the invention a rockable accelerator lever disposed adjacent the brake pedal adapted when rocked in one direction by the operator's foot to actuate the throttle and when subjected to a force tending to rock it in the other direction beyond a given limit to interrupt operation of the throttle and then bring about application of the brakes while keeping the throttle from being opened until the brakes have been subsequently released.

A still further object of the invention, in certain of its embodiments, is to provide brake and throttle control mechanism carried by a brake pedal lever in which spaced operator-operated parts are employed for controlling the respective elements and so arranged with relation to each other as to enable them to be operated by movement of the operator's foot in substantially the same manner as now required for operating corresponding elements by the usual separate brake and accelerator pedals.

Other objects, purposes and advantages of the invention will hereinafter more fully appear or will be understood from the following description and accompanying drawings in which:

Fig. 1 is a side elevation of combined brake and throttle control mechanism constructed in accordance with the invention and showing a brake lever and throttle actuating means adapted to be operated thereby;

Fig. 2 on a slightly larger scale is a fragmentary front elevation thereof, and

Fig. 3, on the same scale, is a fragmentary top plan view partly in substantially horizontal section;

Figs. 4, 5 and 6 are fragmentary views generally corresponding to Figs. 1, 2 and 3 showing brake and throttle control mechanism of slightly different construction;

Figs. 7 and 8, respectively generally corresponding to Figs. 1 and 2, show a third embodiment of the invention of a somewhat different type from those illustrated in the preceding figures, and Figs. 9, 10 and 11, corresponding to Figs. 4, 5 and 6, show still another embodiment.

In the several figures like characters are used to designate the same parts.

Referring first to the mechanism shown in Figs. 1-3, inclusive, the brake pedal lever P is in general of a character substantially similar to those commonly employed for actuating ordinary automobile foot brakes. It is mounted for pivotal movement about a fulcrum pin 1 attached to any suitable relatively rigid frame or other vehicle part and comprises a projecting arm 2 adjacent the fulcrum pin 1 connected by a pin 3 to the usual brake rod 4, a spring 5 between the arm and any suitable fixed point urging the pedal lever toward brake releasing position to supplement the usual spring (not shown) employed for this purpose and thereby afford added stability to the pedal. Above fulcrum pin 1 the pedal lever carries another projecting arm 6 supporting a lever 7 extending from a pivot 8 toward fulcrum pin 1 for connection with a throttle rod 9 by a pin 10 which is coaxial with the pin when the throttle is closed. Lever 7 has a projecting lug 11 on one side adapted to engage an adjusting screw 12 carried by a lug 14 on arm 6 for adjustably limiting the movement of the lever in counterclockwise direction in Fig. 1 to prevent pin 10 moving beyond coaxial relation with pin 1 during closing of the throttle. This lever is operated through a cable 15 having one end secured to it by a clamp fitting 16 with the cable lying between fins 17 defining an arcuate groove 18 coaxial with pivot 8.

Cable 15 extends tangentially from this groove toward the upper part of pedal lever P and when subjected to an upward longitudinal pull causes lever 7 to swing about its pivot 8 in a clockwise direction in Fig. 1 to thereby open the throttle through the medium of rod 9.

The upper part of the cable passes over a sheave 19 rotatably supported adjacent the elbow 20 of the brake pedal lever, thence through a hole 21 in the head H of the pedal and is secured at its end by a connector 22 to an accelerator lever 23 beneath an upper rubber faced pad 24 on said lever which is adapted to be engaged by the operator's foot.

Pedal lever P above elbow 20 conforms generally to an arc of which pin 1 is the center, and where it passes through floor boards F is surrounded by a gasket G which maintains the operator's compartment substantially sealed; cable 15 passes through the gasket, as shown in the drawings, beside the arcuate portion of the pedal lever, and the gasket is therefore formed to provide a clearance for this purpose.

Brake pedal lever P as a whole, and the cable 15 or other mechanism provided for operating throttle rod 9, are actuated by pressure of the operator's foot against accelerator lever 23, the manner in which this pressure is applied determining the consequences of its application, that is, when applied in one way it causes operation of the brakes, and in another operation of the throttle.

Accelerator lever 23 is supported from a fulcrum bolt 25 extending transversely through it and through the lower end of a link 26; the upper end of the link is forked and carried on fulcrum pins 27 threaded into bosses 28 formed on head H of the pedal lever substantially in transverse alignment with the connection between cable 15 and accelerator lever 23 when the throttle is closed. An arm 29 integral with one of the forks of link 26 projects above the adjacent pin 27 and a spring 30 is extended between its extremity and a threaded hook 31 adjustably held by a nut 32 in an upstanding boss 33 adjacent elbow 20 of the pedal lever, and a substantially U-shaped housing 34 preferably encloses the spring and associated parts to prevent interference by the floor boards or otherwise with the action of the spring, which thus biases link 26 in a counterclockwise direction in Fig. 1 and normally holds the link stable with respect to the pedal by engagement of a socket 35, integral with link 26, with a stop 36 formed on and depending below pedal head H.

This head also has formed on its front face adjacent the bosses 28, a pair of curved abutments 37 adapted to be engaged by stops 38 projecting from the rear face of lever 23 behind pad 24 on both sides of the connection of cable 15 therewith, the stops and abutments forming bearing surfaces coaxial with fulcrum pins 27 during movement of lever 23 and link 26 about the axis of the pins in one phase of operation of the pedal. The lever is also capable of movement independently of link 26, however, and may be rocked about fulcrum 25 without moving the link when the pressure of the operator's foot against lower pad 39 on lever 23 exceeds that against upper pad 24, the lever 23 then moving clockwise in Fig. 1 about its fulcrum 25 to pull the adjacent end of cable 15 longitudinally toward the right in said figure and thereby swing the throttle actuating lever 7 about its pivot 8 to open the throttle. When the vehicle is being operated the ball of the operator's foot normally engages pad 24 as indicated in dot and dash lines in Fig. 1 and the extent to which the throttle is opened can thus be accurately controlled, since if it should be excessive the condition can be immediately corrected by increasing the pressure against pad 24 relatively to the amount being exerted on lower pad 39 and the lever 23 thereby swung in the opposite direction on its fulcrum 25 to relieve a portion of the tension on cable 15 and allow the throttle to move correspondingly toward closed position under the influence of the usual throttle return spring (not shown).

When the throttle is closed, stops 38 are in engagement with abutments 37 on the pedal head and if it be desired to apply the brakes the operator merely thrusts generally forward against pad 24 to depress the pedal and actuate brake rod 4; as pivot 10 connecting lever 7 and throttle rod 9 is coaxial with pedal fulcrum pin 1 when the throttle is closed, this movement of the pedal has no effect upon the throttle during the braking operation. Any pressure the operator may exert against the lower pad 39 has likewise no effect upon the throttle, for although it may cause accelerator lever 23 and link 26 to move about the axis of pins 27 as a fulcrum, cable 15 is connected to lever 23 substantially in alignment with this axis so that such movement makes no change in the longitudinal relation of the cable to lever 7. It is thus impossible for the operator to open the throttle during application of the brakes by pressing his heel against lower pad 39 so long as stops 38 are in engagement with abutments 37, for obviously lever 23 cannot be rocked on its fulcrum 25 under this condition, and if their engagement be interrupted by release of pressure against pad 24, spring 5, supplemented by the usual brake return spring, instantly tends to restore it by moving the brake pedal in brake releasing direction.

However, if the throttle is partially or fully open at the time it is desired to apply the brakes, the normal foot operation against the pedal first closes the throttle by moving accelerator lever 23 in a counterclockwise direction in Fig. 1 about pivot 25 and/or moving link 26 to bring stops 38 into engagement with abutments 37, after which braking is carried out as above described; thus the operator may instantaneously shift from throttle to brake operation and concentrate his mind upon the latter, since closing the throttle prior to braking requires no conscious effort and the operator's foot is always substantially in braking position.

In the embodiment of the invention shown in Figs. 4–6 inclusive, a generally similarly arrangement is provided for the brake and throttle operating connections which have been consequently omitted from the drawings. However, accelerator lever 23', which operates cable 15' connected with the throttle actuating mechanism, carries a relatively small upper pad 24' extending only a short distance above the fulcrum formed by bolt 25' and has an offset arm 42, extending upwardly and to one side of a brake pad 43, for connection with the cable at a point normally substantially aligned with the axis of a pin 27' on which is pivoted the link 26' supporting the accelerator lever fulcrum 25'. Brake pad 43 is carried by and capable of movement about pin 27' which extends through spaced lugs 44 on the back of the pad, and stops 45, 46, integral with the pedal head above and below the axis of the pin, limit this movement of the pad. When in normal position, as indicated in Fig. 4, pads 24' and 43 lie in substantially the same plane and the operator's foot can engage both of them, but during throttle operation when accelerator lever 23' is swung about its fulcrum 25' by pressure of the operator's heel on lower pad 39', the upper pad 24' moves outwardly from the plane of pad 43 and the latter thus cannot interfere with the sensitivity of the operator's control of the throttle, the small pad 24' however affording support to the adjacent part of the foot when disengaged from upper pad 43. Link 26' carried on pin 27' and supporting at its lower end accelerator lever fulcrum bolt 25' is movable about pin 27' and has a shoulder 47 adapted to engage the rear face of stop 45 to limit the link movement in one direction under the influence of a spring 30' extending between the link arm 29' and the adjustable hook 31' connected with boss 33' formed on the pedal lever. Spring 30' thus urges the link toward normal position as shown in Fig. 4 after it has been moved therefrom about pin 27' by pressure of the operator's foot against upper pad 24' or against it and lower pad 39' before braking. The movements of the operator's foot to control the throttle and brakes are therefore substantially the same as in the form of the invention previously described and the several corresponding parts function in a substantially similar manner.

Although in the forms of the invention heretofore described the throttle actuating movement of the foot is somewhat different from the orthodox, users readily become accustomed to it and find it distinctly more comfortable and less fatiguing, especially during long journeys. However, in cases in which it is desired to employ a combined brake and throttle control in which the foot movement required for operating the throttle is substantially conventional, the mechanism shown in Figs. 7 and 8 may be utilized. This mechanism includes a pad 43' fixed on the pedal head, and pad 24'' of accelerator lever 23'' is angularly and laterally offset with relation to pad 43' so that lateral movement of at least part of the operator's foot is required to bring it from pad 24'' to pad 43' when shifting from throttle to brake operation or vice versa. Both these operations are thus selectively effected by application of pressure through the ball of the foot to different pedal parts, i. e., to pad 43' or pad 24'', whereas in the preceding forms pressure selectively applied primarily through the heel, normally employed for operating the throttle, and the ball of the foot, normally employed for operating the brake, produces like results.

More particularly, accelerator lever 23'' is supported for pivotal movement from a fulcrum 25'' carried by a link 26'' pivoted on a pin 27'' extending transversely through pedal head H'', and the link 26'' is biased counterclockwise in Fig. 7 toward normal position by a coil spring 30'' interposed between it and a socket 49 in an abutment 33'' on the pedal lever, a stop 36'' engaging brake pad 43' to limit this movement of the link. Furthermore a rod 15a is utilized in place of a cable for connecting the accelerator lever to the throttle so that pressure on pad 24'' will open the latter, the end of the rod being pivoted to an arm 42' on the lever.

An extension 26a integral with link 26'' projects below the fulcrum 25'' and carries a heel supporting lower pad 39'' which is rigid with the link and therefore usually substantially stationary during throttle operation; the pad and the link may be moved during braking about fulcrum 27'' but due to the normal coaxial relation of the fulcrum and the connection of lever 23'' with rod 15a, this movement has no influence upon the latter so the pad 39'' merely serves as a convenient heel rest, movable with and relatively to the brake pedal. The heel normally does not bear heavily enough against pad 39'' to overcome the influence of spring 30'' and move link 26'', but if any such movement does take place it produces no perceptible change in the setting or operation of the throttle since the resultant longitudinal movement of rod 15a is only extremely slight, even when pad 39'' is depressed while the throttle is substantially wide open.

Figs. 9, 10 and 11 show another embodiment of the invention more nearly analogous to that shown in Figs. 4, 5 and 6. In this embodiment the accelerator lever 23''' is pivoted on a fulcrum pin 25''' carried by a pivoted link 26''' supported from a pivot pin 27''' on brake pedal head H''', but the link 26''' supporting the accelerator lever fulcrum is of such length that said fulcrum is positioned close to upper pad 24''' of the accelerator lever. This pad extends adjacent fixed pad 43'' on the brake pedal in parallelism with its lower edge but projects slightly outwardly beyond its general plane so as to be first engaged by the ball of the operator's foot when the brakes are to be applied, whereby the pad is depressed and link 26''' therefore moved about its pivot 27''' before any material pressure is exerted on the brake pad to operate the brakes. A compression spring 30''' interposed between link 26''' and an abutment formed by a depending boss 33''' integral with the brake pedal arm yieldingly resists such movement of the link and normally maintains it in engagement with a stop 36''' on the fixed brake pedal head H''' so as to maintain the accelerator lever fulcrum in fixed position during throttle operation.

This operation is effected as in the two mechanisms first described through cable 15''' which is connected to an upwardly projecting arm 42'' of the accelerator lever at a point which is substantially in alignment with the axis of link pivot 27''' when the throttle is closed.

As the upper pad 24''' of the accelerator lever is fairly close to fulcrum 25''' about which the latter moves in operating the throttle, the ball of the foot can exert relatively little influence upon the movement of the accelerator lever in response to pressure of the operator's heel on lower pad 39'''; that is, the reaction of the heel pressure against the ball of the operator's foot is minimized due to the mechanical advantage afforded by the position of the accelerator lever fulcrum with respect to its pads.

The accelerator lever is adapted to be depressed by the operator's heel to open the throttle through movement of the lever about its fulcrum 25''' and to be returned by the ordinary throttle spring when the pressure is relieved. When the brakes are to be applied, the pressure exerted through the ball of the operator's foot is first resolved against pad 24''' and moves link 26''' and accelerator lever 23''' about pivot 27''' against the bias of spring 30''', thereby allowing the foot to contact brake pad 43'' and simultaneously move the lower pad 39''' away from the operator's heel, thus preventing operation of the throttle as the brakes are applied through further pressure of the ball of the foot. Upon removal of this pressure as the brakes are released, the link is restored to its normal position by spring 30''' and the lower pad of the accelerator lever returns to a corresponding position where it again becomes accessible to the operator's heel for controlling the throttle.

Each of the several embodiments of the invention herein disclosed thus comprises mechanism in which the fulcrum or pivotal center of the accelerator pedal is adapted to be moved relatively to the brake pedal during braking and in which operation of the throttle by the accelerator pedal is substantially inhibited while this fulcrum is in other than its normal position. Moreover, sensitive control of the throttle actuating mechanism is afforded when the accelerator pedal fulcrum is in such position due largely to the fact that the heel and the ball of the operator's foot are rested against pedal parts and the operator can therefore more readily adjust his foot to various positions than when as in mechanisms heretofore employed one part of the foot is either unsupported or rested upon the floor or a stationary rest fixed thereto.

Particularly in the mechanism shown in Figs. 1-3, inclusive, and to a lesser extent in those shown in Figs. 4-6, inclusive and 9-11, inclusive, since the force exerted by one part of the foot can partially react against another part thereof rather than entirely against the mechanism being operated, sensitiveness of throttle control is substantially increased as compared to that afforded by control mechanisms utilizing the heretofore customary principles of operation, while the time lag incident to the necessary shifting of the foot from a separate accelerator pedal to a brake pedal or vice versa, is entirely eliminated.

It will now be apparent that as in the case of the inventions of our said earlier applications for patent, a primary purpose of the present invention is to improve and simplify the control of a motor vehicle; consequently the particular embodiment of mechanism within the purview of all said inventions which may be most advantageously employed in any particular case will usually be dictated by the design and/or character of the motor vehicle in which it is to be incorporated, manufacturing conditions and other like considerations.

While we have herein described with considerable particularity certain embodiments of our invention well adapted for attaining the purposes and objects thereof which can be readily manufactured on a production basis, it will be understood that we do not desire or intend to limit or confine ourselves thereto or thereby in any way, as changes and modifications in the form, construction, arrangement and relationship of the several parts as well as in their mode of operation will readily occur to those skilled in the art and may be made if desired without departing from the spirit and scope of the invention as defined in the appended claims.

Having thus described our invention, we claim and desire to protect by Letters Patent of the United States:

1. Automotive vehicle brake and throttle control mechanism comprising a movable brake pedal lever, an accelerator lever and means supporting the accelerator lever from the brake lever for selective movement relatively thereto about spaced pivotal axes.

2. Automotive vehicle brake and throttle control mechanism comprising a movable brake arm, an accelerator lever selectively movable relatively thereto about spaced axes, a connection normally aligned with one of said axes extending to throttle actuating means; spaced parts respectively engageable by the ball and the heel of the operator's foot for selectively transmitting pressure exerted by said ball to the brake arm to thereby actuate the brake and by said heel to the accelerator lever to thereby move the latter about one of said axes to actuate the throttle through said connection, the accelerator lever being movable about the other of said axes during braking.

3. Automotive vehicle brake and throttle control mechanism comprising a movable brake pedal lever, an accelerator lever, means supporting the accelerator lever from the brake lever for selective movement relatively thereto about spaced pivotal axes, yielding means interposed between the supporting means and the brake lever and a stop cooperative with said yielding means to normally maintain the supporting means in position to yieldingly inhibit movement of the accelerator lever about one of said axes.

4. Automotive vehicle brake and throttle control mechanism comprising a movable brake pedal lever, an accelerator lever, means supporting the accelerator lever from the brake lever for selective movement about spaced pivotal axes, yielding means interposed between the supporting means and the brake lever, a stop cooperative with said yielding means to normally maintain the supporting means in position to yieldingly inhibit movement of the accelerator lever about one of said axes and means normally substantially aligned with the last mentioned axis interconnecting the accelerator lever with throttle actuating means.

5. Automotive vehicle brake and throttle control mechanism comprising a movable brake pedal lever, an accelerator lever, means supporting the accelerator lever from the brake lever for selective movement about spaced pivotal axes, and means normally substantially aligned with one of said axes for interconnecting the accelerator lever with throttle actuating means.

6. Automotive vehicle brake and throttle control mechanism comprising a movable brake pedal lever, an accelerator lever supported therefrom and selectively movable with respect thereto about spaced pivotal axes, the accelerator lever having a connection with throttle actuating means at a point in substantial alignment with one of said axes and operator-operated parts carried by said accelerator lever respectively operable to move it about said axes.

7. Automotive vehicle brake and throttle control mechanism comprising a movable brake pedal lever, a link depending therefrom and pivoted thereto, an accelerator lever pivotally supported from the link below the link pivot, throttle actuating means interconnected with the accelerator lever at a point normally in substantial alignment with the link pivot and means for moving the link about said pivot in response to pressure of the operator's foot while actuating the brake lever.

8. Automotive vehicle brake and throttle control mechanism comprising a movable brake pedal lever, a link pivoted thereto, means for yieldingly maintaining the link in substantially fixed relation to the brake lever, and an accelerator lever pivotally supported from the link and having a connection with throttle actuating means normally disposed in substantially coaxial relation with the pivotal connection of the link to the brake lever.

9. Automotive vehicle brake and throttle control mechanism comprising a brake pedal lever connected to a brake and having a fixed fulcrum, an accelerator lever having a movable fulcrum, means having a pivotal connection with the brake lever forming the movable fulcrum for the accelerator lever, and means carried by the accelerator lever in substantially coaxial relation with said pivotal connection when the throttle is closed having connection with the throttle and adapted to actuate it in response to movement of the accelerator lever on its movable fulcrum.

10. Automotive vehicle brake and throttle control mechanism comprising a brake pedal lever connected to a brake and having a fixed fulcrum, an accelerator lever, pivotally supported means forming a movable fulcrum for the accelerator lever, yielding means urging the fulcrum forming means in one direction on its pivot and means carried by the brake lever for limiting movement of the fulcrum forming means in said direction under the influence of said yielding means.

11. In mechanism of the character described, a pedal arm, a link pivoted thereto and depending therefrom, yielding means urging the link in one direction about its pivot, means for limiting movement of the link in said direction and an operator-operated part pivoted to the link at a point remote from its pivotal connection with the arm and having connection with control mechanism at a point normally substantially coaxial with said pivotal connection.

12. Automotive vehicle brake and throttle control mechanism comprising a brake pedal connected to a brake and having a fixed fulcrum, an accelerator lever, a link pivoted to the pedal and to the lever, operator-operated parts carried by the lever on opposite sides of its pivotal connection with the link respectively adapted for movement by the operator to move the lever about said pivotal connection, means connecting the lever with throttle actuating means and means limiting pivotal movement of the link in one direction.

13. Automotive vehicle brake and throttle control mechanism comprising a brake pedal lever having a relatively fixed fulcrum, a brake pad carried by the lever, a link pivoted to the lever, an accelerator lever pivoted to the link having operator-operated parts oppositely disposed with respect to its pivotal connection with the link, one of said parts being normally in substantially the same plane as the brake pad, means connecting the accelerator lever with throttle actuating means at a point normally coaxial with the pivotal connection of the link to the brake lever and movable with the accelerator lever out of said relation as the latter is moved about its pivotal connection with the link, and means for yieldingly maintaining the link at the limit of its movement in one direction with respect to the brake lever.

14. Automotive vehicle brake and throttle control mechanism comprising a movable brake pedal lever, a link pivoted thereto, an accelerator lever carried by the link and adapted for pivotal movement with respect thereto, said accelerator lever having a throttle connection normally substantially aligned with the link pivot, and operator-operated parts carried by the accelerator lever respectively adapted to be moved in opposite directions by the pressure of the operator's foot to selectively actuate the brake pedal lever and throttle.

15. Automotive vehicle brake and throttle control mechanism comprising a movable brake pedal lever, an accelerator lever, a link interposed between and respectively pivoted to the accelerator lever and the brake lever, means for yieldingly maintaining the link in predetermined position with respect to the brake lever and means carried by the accelerator lever adapted to engage the brake lever for moving the latter.

16. In mechanism of the character described, a pedal arm, a link pivoted thereto, means for limiting movement of the link about its pivot in one direction, an operator-operated part pivoted to the link and operable to move it about its pivot in the opposite direction, said part being adapted to engage the arm adjacent the pivotal connection of the link thereto.

17. In mechanism of the character described, a pedal arm, a link pivoted thereto and an operator-operated part pivoted to the link and operable to move it about its pivot in one direction, said part having a bearing surface substantially coaxial with the link pivot adapted to engage the arm adjacent thereto for transmission of pressure to the arm and said surface moving with the link in engagement with the arm when the link is moved about its pivot.

18. In mechanism of the character described, a pedal arm, a link pivoted thereto, an operator-operated part pivoted to the link and operable to move it about its pivot in one direction, said part having a bearing surface substantially coaxial with the link pivot adapted to engage the arm adjacent thereto for transmission of pressure to the arm and said surface moving with the link in engagement with the arm when the link is moved about its pivot, and yielding means tending to return the operator-operated part and link to initial position upon release of pressure on said part sufficient to induce said movement.

19. Automotive vehicle brake and throttle control mechanism comprising a brake pedal lever, a brake pad carried thereby engageable by the ball of the operator's foot, a link pivoted thereto and depending therefrom providing a surface engageable by the operator's heel, means for yieldingly maintaining the link at its limit of travel about its pivot in one direction, an accelerator lever pivotally supported from the link, a pad carried by the accelerator lever adjacent the brake pad and engageable by said ball and means normally in substantially coaxial relation with the link pivot for connecting the accelerator lever to throttle actuating means and moving with the accelerator lever out of said relation when said accelerator lever is moved about its pivot to control the throttle.

FRANK G. ALBORN.
JAMES B. FRANKS, Jr.